(12) United States Patent
Heuver et al.

(10) Patent No.: US 9,273,737 B2
(45) Date of Patent: Mar. 1, 2016

(54) INTEGRATED PINION CARRIER AND OVERRUNNING ELEMENT RACE

(75) Inventors: Bradley R. Heuver, South Lyon, MI (US); Gregory D. Goleski, Rochester Hills, MI (US); James G. Gibboney, Livonia, MI (US); Srinivas M. Arcota, Northville, MI (US); Dennis N. Wys, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 754 days.

(21) Appl. No.: 13/568,189

(22) Filed: Aug. 7, 2012

(65) Prior Publication Data

US 2014/0045643 A1    Feb. 13, 2014

(51) Int. Cl.
*F16H 57/08* (2006.01)
*F16D 41/12* (2006.01)

(52) U.S. Cl.
CPC ............... *F16D 41/12* (2013.01); *F16H 57/08* (2013.01); *F16H 2057/087* (2013.01)

(58) Field of Classification Search
CPC ............................. F16D 41/12; F16H 57/082
See application file for complete search history.

(56) References Cited

U.S. PATENT DOCUMENTS

| | | | |
|---|---|---|---|
| 3,939,736 A | 2/1976 | Morin | |
| 5,470,286 A | 11/1995 | Fan | |
| 6,607,734 B1 | 8/2003 | Afriat | |
| 6,743,148 B2 | 6/2004 | Hayabuchi et al. | |
| 6,855,089 B2 | 2/2005 | Poulin et al. | |
| 7,223,198 B2 * | 5/2007 | Kimes | F16D 41/12 475/324 |
| 7,654,929 B2 | 2/2010 | Kimes et al. | |
| 8,187,141 B2 | 5/2012 | Goleski et al. | |
| 2010/0029435 A1 | 2/2010 | Kimes et al. | |
| 2010/0105515 A1 * | 4/2010 | Goleski et al. | 475/341 |
| 2010/0304918 A1 | 12/2010 | Burgman et al. | |

* cited by examiner

*Primary Examiner* — Derek D Knight
(74) *Attorney, Agent, or Firm* — James Dottavio; MacMillan, Sobanski & Todd, LLC

(57) ABSTRACT

A pinion carrier includes a first disc including ring segments, each ring segment extending angularly about an axis and spaced angularly from the other ring segments, a second disc, spacers secured to the discs and separating the discs axially, and retention elements, each retention element secured to one of the ring segments.

16 Claims, 4 Drawing Sheets

INTEGRATED PINION CARRIER AND OVERRUNNING ELEMENT RACE

BACKGROUND OF THE INVENTION

1. Field of the Invention

This invention relates generally to an integrated one-piece pinion carrier disc and the race of an overrunning control element, such as a one-way clutch or brake.

2. Description of the Prior Art

A pinion carrier is a device for an automatic transmission that supports pinions of a planetary gearset in rotation and revolution about an external axis. An overrunning clutch is a device that transmits rotating power between two rotatable components in one rotary direction and overruns in the opposite direction. An overrunning brake holds one component against rotation in one rotary direction and overruns in the opposite direction, thereby allowing the component to rotate freely.

Conventionally pinion carriers are used in combination with overrunning control elements, such as a one-way clutch or brake. A need exists in the automotive industry to reduce weight of motor vehicles components and assemblies.

SUMMARY OF THE INVENTION

A pinion carrier includes a first disc including ring segments, each ring segment extending angularly about an axis and spaced angularly from the other ring segments, a second disc, spacers secured to the discs and separating the discs axially, and retention elements, each retention element secured to one of the ring segments.

By integrating the pinion carrier and overrunning control element, material between each of the pinions was able to be removed without compromising structural continuity, reliability and service life.

This weight saving is not possible with a conventional design due to there being no material to hold the control element together.

The integrated part has only one joint, and therefore less lash.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
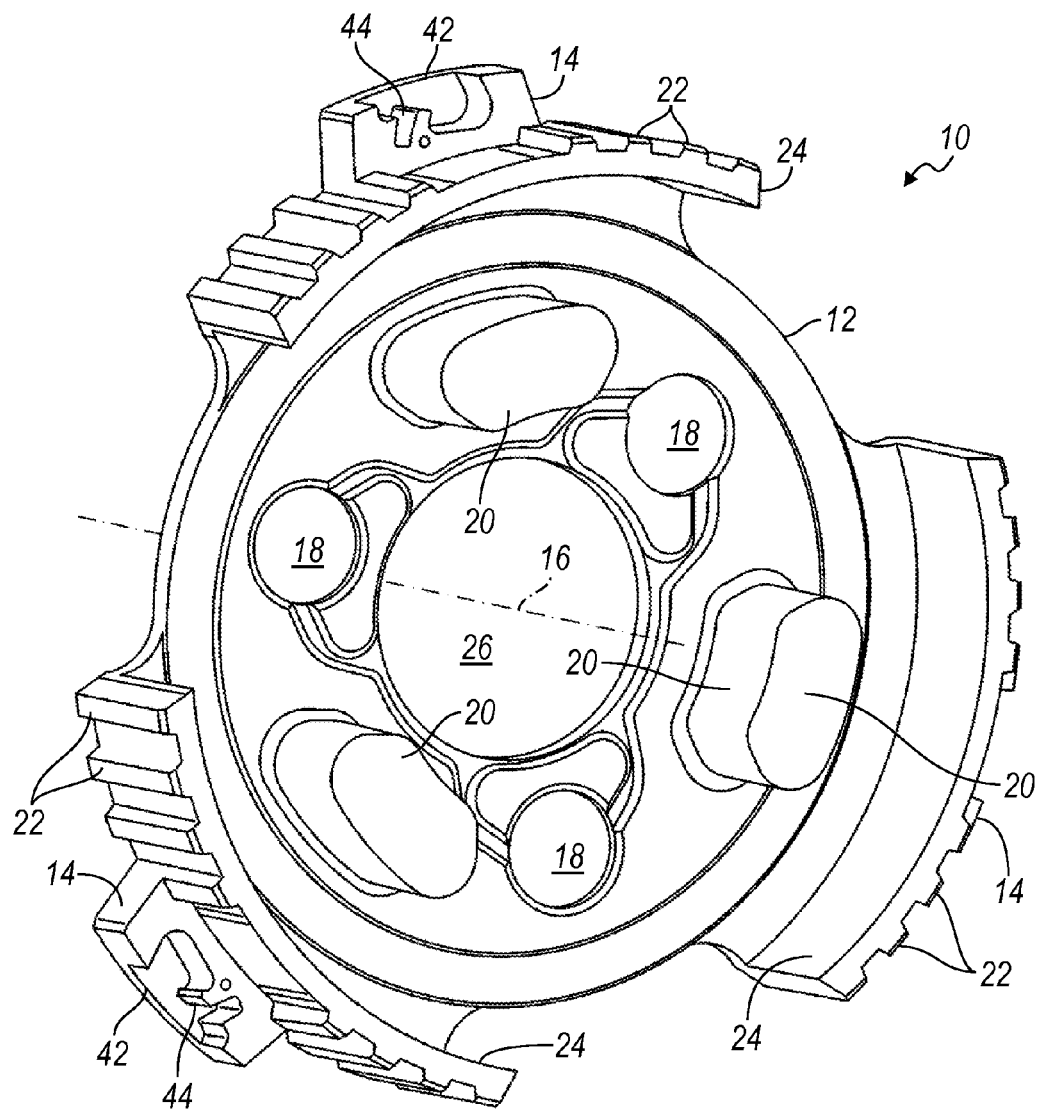
FIG. 1 is a perspective view of a pinion carrier disc with integrated engagement elements.

FIG. 1 illustrates a subassembly 10 comprising a pinion carrier disc 12 integrated with retention elements 14 of an overrunning torque transmitting device, such as a one-way clutch (OWC) or a one-way brake (OWB). Preferably the assembly 10 includes at least three of the retention elements 14.

The inner face of the carrier disc 12 is formed with holes 18, mutually spaced angularly about axis 16, and spacers 20, mutually spaced angularly about axis 16. Disc 12 is formed with a central opening 26 aligned with axis 16.

A discontinuous ring 24 is formed in three angular segments mutually spaced angularly about axis 16, each segment located radially outboard of each spacer 20. Each segment of ring 24 includes a set of axial spine teeth 22 formed on a surface of the ring segment that is cantilevered from the outer periphery of disc 12. Each retention element 14 is supported on one of the segments of ring 24.

Figure 2:
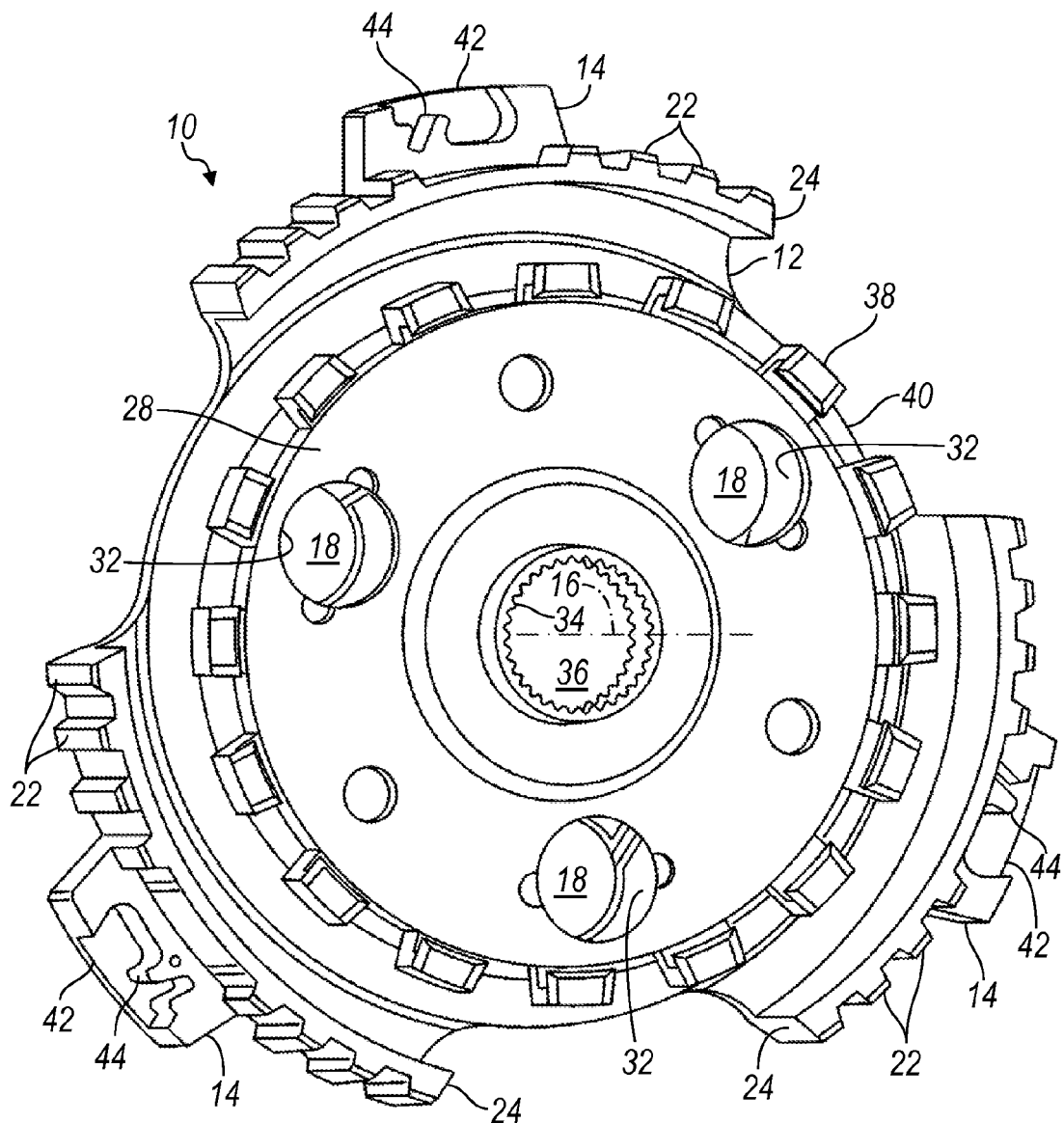
FIG. 2 is perspective view of a subassembly comprising the integrated pinion carrier disc of FIG. 1 combined with a second carrier plate.

The subassembly 10 of FIG. 2 is preferably formed as an integrated, single-piece of sintered powered metal.

A second pinion carrier disc 28 is formed with holes 32, each hole 32 aligned with one of the holes 18; internal spline teeth 34; a central opening 36; and a circle of axial spline teeth 38 surrounding the central opening 36. The diameter of the outer periphery 40 of carrier disc 28 is substantially equal to the diameter of the carrier disc 12 in the region outboard of the holes 18.

Each pair of aligned holes 18, 32 supports a pinion shaft (not shown), which supports a planet pinion (not shown) located in the axial space between discs 12, 28. Pinion shafts and pinions, similar to those used in this assembly, are shown and described in U.S. Pat. No. 8,187,141, the entire disclosure of which is incorporated herein by reference.

Figure 3:
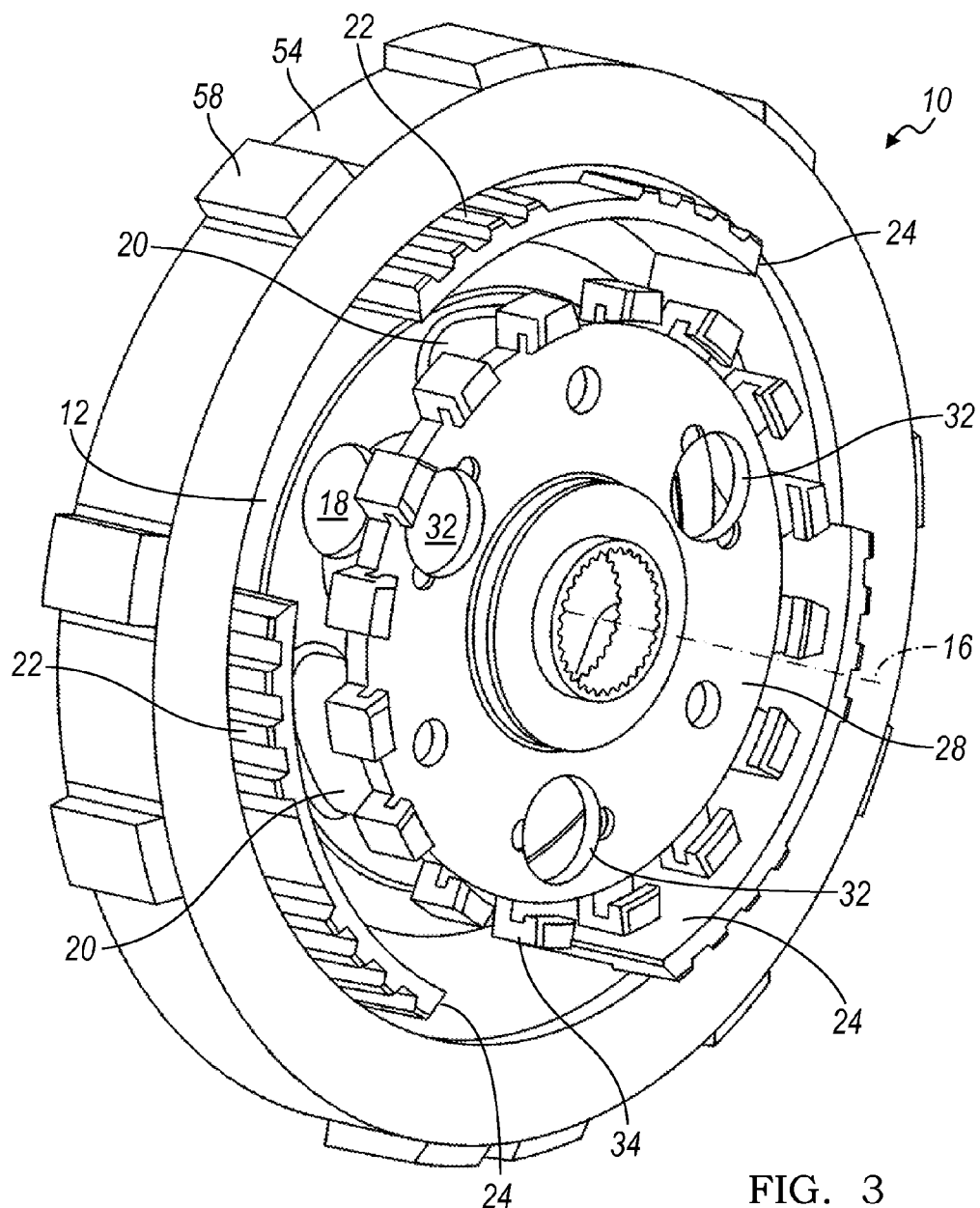
FIG. 3 is a perspective view showing an outer ring combined with the integrated pinion carrier assembly of FIG. 2.
Figure 4:
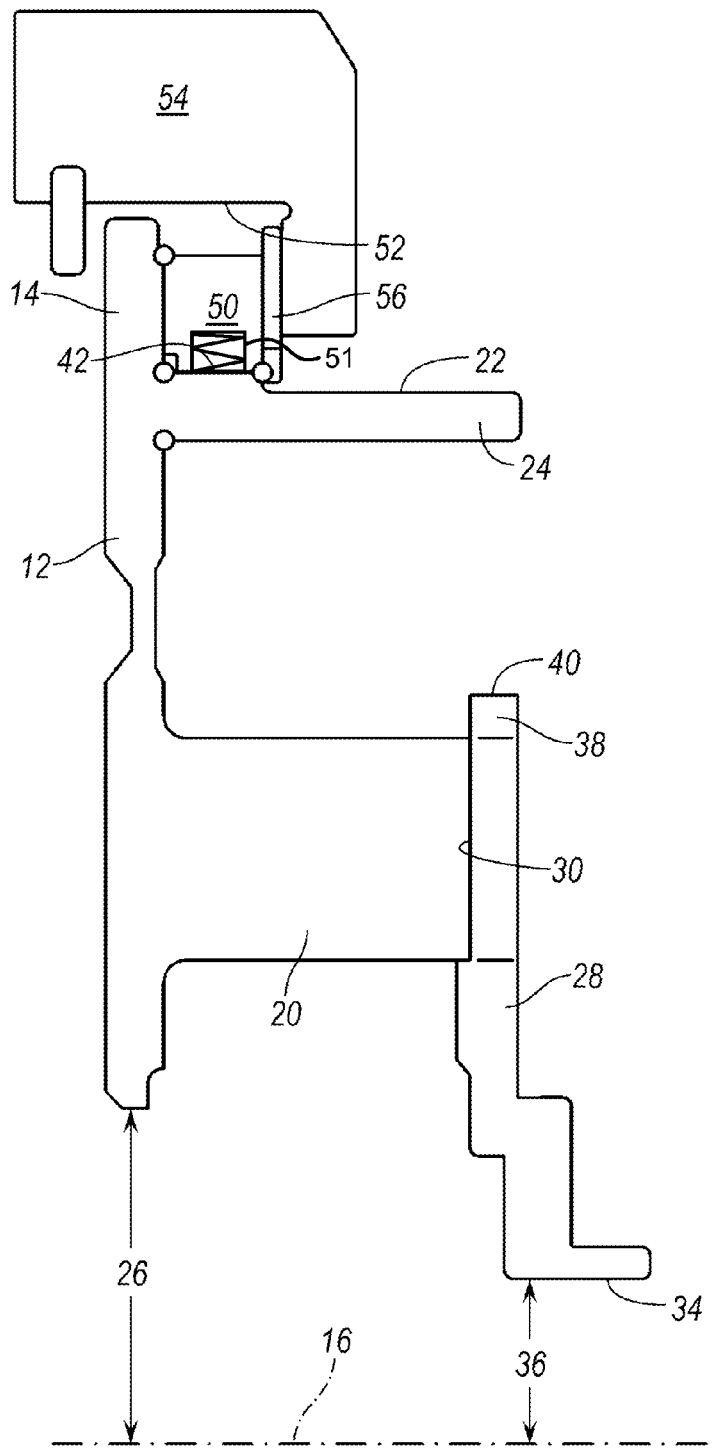
FIG. 4 is schematic cross section taken at a diametric plane through one of the spacers of the assembly of FIG. 3.

As FIGS. 3 and 4 show, each retention element 14 is formed with a pocket 42, in which an engagement element 50, such as a rocker or sprag of a OWC or OWB is located. Each retention element 14 is also formed with a recess 44, in which a compression spring 51 is located. Each spring 51 urges one of the engagement elements 50 to pivot in its pocket 42 radially outward and into engagement with one of the cams 52 formed on an inner surface of an outer ring 54. Rockers, cams and springs, similar to those used in this assembly, are shown and described in U.S. Pat. Nos. 7,661,518 and 7,614,486, the entire disclosures of which are incorporated herein by reference.

A stamped wear plate 56, located adjacent the outer ring 54 and secured by spline 22 to carrier disc 12 for rotation with disc 12, retains each engagement element 50 in its pocket 42 and each spring in its recess 44 and prevents damage to the engagement elements 50 and the springs due to rotation of the disc 12 relative to the outer ring 54.

When the engagement elements 50 engage the cams 52 on the outer ring 54, the carrier discs 12, 28 are releaseably secured to the outer ring, thereby preventing relative rotation therebetween. When the engagement elements 50 disengage cams 52, the carrier discs 12, 28 are free to rotate relative to the outer ring 54.

When the assembly is used in a clutch application, the outer ring 54 is supported for rotation about axis 16. When the assembly is used in a brake application, the outer ring 54 is fixed to a transmission case against rotation by spline teeth 58 formed on the outer surface of the outer ring 54.

The carrier disc 12 and retention elements 14 and spacers 20 are a formed integrally of sintered powdered metal in a single unit with no mechanical connection or fasteners. The second pinion carrier disc 28, also formed integrally of sintered powdered metal in a single unit with no mechanical connection or fasteners, is sinter-brazed at a surface 30 to the spacers 20, as shown in FIG. 4. By combining these discs 12 and 28 in one part without including material in the vicinity of the pinions that would produce annular structural continuity between the segments of ring 24, weight saving can be maximized.

In accordance with the provisions of the patent statutes, the preferred embodiment has been described. However, it should be noted that the alternate embodiments can be practiced otherwise than as specifically illustrated and described.

The invention claimed is:

1. A pinion carrier, comprising:
   a first disc including ring segments, each ring segment extending angularly about an axis and spaced angularly from the other ring segments;
   a second disc;
   spacers secured to the discs and separating the discs axially;
   retention elements integral with the first disc as a single monolithic unit, each retention element is integral to one of the ring segments of the first disc and extends radially outward from the ring segments; and
   wherein each retention element includes a pocket having an open end, and a recess having an open end; each segment of the ring includes spline teeth; and further comprising a wear plate engaged with the spline teeth and covering the open ends of the pockets and the recesses.

2. The pinion carrier of claim 1, further comprising:
   an outer ring encircling the first disc; and
   wherein each retention element is adapted to receive an engagement element and a spring that urges the engagement element toward engagement with the outer ring.

3. The pinion carrier of claim 1, wherein the first disc, second disc, spacers and retention elements are formed integrally without a mechanical connection or fastener.

4. The pinion carrier of claim 1, wherein the first disc, second disc, spacers and retention elements are formed of sintered powdered metal.

5. The pinion carrier of claim 1, wherein the first disc and spacers are formed integrally in one-piece and further comprising a surface at which the second disc is sinter-brazed to the spacers.

6. The pinion carrier of claim 1, wherein:
   each of the pockets is adapted to contain an engagement element supported to pivot in the pocket;
   each of the recesses is adapted to contain a spring that urges the engagement element to pivot.

7. A pinion carrier, comprising:
   a first disc including ring segments, each ring segment extending angularly about an axis and spaced angularly from the other ring segments;
   a second disc;
   spacers secured to the discs and separating the discs axially;
   retention elements integral with the first disc as a single monolithic unit, each retention element is integral to one of the ring segments of the first disc and extends radially outward from the ring segments, and containing an engagement element supported to pivot in the pocket and a spring urging the engagement element to pivot; and
   wherein each retention element includes a pocket having an open end, and a recess having an open end; each ring segment includes spline teeth; and further comprising a wear plate engaged with the spline teeth and covering the open ends of the pockets and the recesses.

8. The pinion carrier of claim 7, further comprising:
   an outer ring encircling the first disc; and
   wherein each spring urges one of the engagement elements toward engagement with the outer ring.

9. The pinion carrier of claim 7, wherein the first disc, second disc, spacers and retention elements are formed integrally without a mechanical connection or fastener.

10. The pinion carrier of claim 7, wherein the first disc, second disc, spacers and retention elements are formed of sintered powdered metal.

11. The pinion carrier of claim 7, wherein the first disc and spacers are formed integrally in one piece, and further comprising a surface at which the second disc is sinter-brazed to the spacers.

12. The pinion carrier of claim 7, wherein:
   each of the pockets is adapted to contain one of the engagement elements;
   each of the recesses is adapted to contain one of the springs.

13. A pinion carrier, comprising:
   a first disc including ring segments, each ring segment extending angularly about an axis and spaced angularly from the other ring segments;
   a second disc;
   spacers secured to the discs and separating the discs axially;
   retention elements integral with the first disc as a single monolithic unit, each retention element is integral to one of the ring segments of the first disc and extends radially outward from the ring segments, wherein the first disc, second disc, spacers and retention elements are formed integrally of sintered powdered metal without a mechanical connection or fastener; and
   wherein each retention element includes a pocket having an open end, and a recess having an open end; each segment of the ring includes spline teeth; and further comprising a wear plate engaged with the spline teeth and covering the open ends of the pockets and the recesses.

14. The pinion carrier of claim 13, further comprising:
   an outer ring encircling the first disc; and
   wherein each retention element is adapted to receive an engagement element and a spring that urges the engagement element toward engagement with the outer ring.

15. The pinion carrier of claim 13, wherein the first disc and spacers are formed integrally in one-piece, and further comprising a surface at which the second disc is sinter-brazed to the spacers.

16. The pinion carrier of claim 13, wherein:
   each of the pockets is adapted to contain an engagement element supported to pivot in the pocket;
   each of the recesses is adapted to contain a spring that urges the engagement element to pivot.

* * * * *